US010068097B2

(12) United States Patent
Ohrimenko et al.

(10) Patent No.: US 10,068,097 B2
(45) Date of Patent: Sep. 4, 2018

(54) DATA CENTER PRIVACY

(71) Applicant: Microsoft Technology Licensing, LLC, Redmond, WA (US)

(72) Inventors: Olga Ohrimenko, Cambridge (GB); Manuel Costa, Cambridge (GB); Cedric Fournet, Cambridge (GB); Christos Gkantsidis, Ely (GB); Markulf Kohlweiss, Cambridge (GB); Divya Sharma, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 14/824,310

(22) Filed: Aug. 12, 2015

(65) Prior Publication Data
US 2017/0046520 A1  Feb. 16, 2017

(51) Int. Cl.
*H04L 29/06* (2006.01)
*G06F 21/60* (2013.01)
*G06F 9/50* (2006.01)
*G06F 21/62* (2013.01)

(52) U.S. Cl.
CPC .......... *G06F 21/602* (2013.01); *G06F 9/5066* (2013.01); *G06F 21/6218* (2013.01); *H04L 63/0428* (2013.01); *H04L 2209/16* (2013.01)

(58) Field of Classification Search
CPC . G06F 21/602; G06F 21/6218; H04L 63/0428
USPC ....................................................... 713/165
See application file for complete search history.

(56) References Cited

U.S. PATENT DOCUMENTS

| 8,321,873 | B2 | 11/2012 | Shao |
| 8,510,538 | B1 | 8/2013 | Malewicz et al. |
| 8,756,410 | B2* | 6/2014 | Raykova ............ H04L 9/085 380/28 |
| 9,118,639 | B2* | 8/2015 | Phegade ............ H04L 9/083 |
| 2012/0151292 | A1 | 6/2012 | Rowstron et al. |

(Continued)

OTHER PUBLICATIONS

PCT Written Opinion of the International Preliminary Examining Authority dated Apr. 26, 2017 for PCT Application No. PCT/US2016/044142, 4 pages.

(Continued)

*Primary Examiner* — Teshome Hailu
(74) *Attorney, Agent, or Firm* — Drinker Biddle & Reath LLP

(57) ABSTRACT

A data center has a plurality of secure processing units; a plurality of data stores holding encrypted data records; and a network connecting the secure processing units and the data stores. The secure processing units comprise computing functionality configured to execute a data processing operation in parallel on the secure processing units by being configured to read encrypted records from the stores, process one or more of the encrypted records within the secure processing units, send one or more of the encrypted records to the stores. The data center is configured to carry out a secret shuffle of the data records to protect the privacy of data processed in the data center from an observer observing any one or more of: the reading of the records, the sending of the records, the writing of the records; the secret shuffle comprising a random permutation of the records hidden from the observer.

20 Claims, 10 Drawing Sheets

(56) References Cited

U.S. PATENT DOCUMENTS

| | | | |
|---|---|---|---|
| 2013/0104145 A1* | 4/2013 | Wee | G06F 9/546 719/313 |
| 2013/0219394 A1 | 8/2013 | Goldman et al. | |
| 2013/0297624 A1 | 11/2013 | Raghunathan et al. | |
| 2014/0059552 A1 | 2/2014 | Cunningham et al. | |
| 2014/0281531 A1* | 9/2014 | Phegade | H04L 9/083 713/168 |
| 2014/0358977 A1 | 12/2014 | Cramer et al. | |
| 2015/0089574 A1* | 3/2015 | Mattsson | G06F 17/30315 726/1 |
| 2015/0150017 A1 | 5/2015 | Hu et al. | |

OTHER PUBLICATIONS

Idris, et al., "In-Map/In-Reduce: Concurrent Job Execution in MapReduce", In Proceedings of IEEE 13th International Conference on Trust, Security and Privacy in Computing and Communications, Sep. 26, 2014, 6 pages.

Maclean, Diana., "A Very Brief Introduction to MapReduce", Published on: Jul. 26, 2013 Available at: http://hci.stanford.edu/courses/cs448g/a2/files/map_reduce_tutorial.pdf.

Li, et al., "Improving the Shuffle of Hadoop MapReduce", In Proceedings of IEEE 5th International Conference on Cloud Computing Technology and Science, vol. 1, Dec. 2, 2013, pp. 266-273.

"Optimizing MapReduce Jobs Using Perfect Balance", Published on: Nov. 28, 2013 Available at: http://docs.oracle.com/cd/E41604_01/doc.22/e41241/balance.htm#BIGUG279.

Bamha, et al., "Scalability and Optimisation of GroupBy-Joins in MapReduce Scalability and Optimisation of GroupBy-Joins in MapReduce", In Technical report, Mar. 2015, 21 pages.

Karloff, et al., "A Model of Computation for MapReduce", In Proceedings of the twenty-first annual ACM-SIAM symposium on Discrete Algorithms, Jan. 17, 2010, 11 pages.

Andresmh, "NYC taxi trips", Jul. 7, 2015 Available at: http://www.andresmh.com/nyctaxitrips/.

Ajtai, et al., "An 0(n log n) sorting network", In Proceedings of the fifteenth annual ACM symposium on Theory of computing, Dec. 1, 1983, 9 pages.

"Apache Hadoop", Jul. 7, 2015 Available at: http://wiki.apache.org/hadoop/.

Arasu, et al., "Orthogonal Security with Cipherbase", In proceedings of 6th Biennial Conference on Innovative Data Systems Research, Jan. 6, 2013, 10 pages.

Bajaj, et al., "TrustedDB: A Trusted Hardware-Based Database with Privacy and Data Confidentiality", In Proceedings of IEEE Transactions on Knowledge and Data Engineering, vol. 26, Issue 3, Mar. 2014, pp. 752-765.

Batcher, K.E., "Sorting networks and their applications", In Proceedings of the Spring Joint Computer Conference, Apr. 30, 1968, pp. 307-314.

Baumann, et al., "Shielding Applications from an Untrusted Cloud with haven", In Proceedings of the 11th USENIX conference on Operating Systems Design and Implementation, Oct. 6, 2014, pp. 267-283.

Blass, et al., "PRISM: privacy-preserving search in mapreduce", In Proceedings of the 12th international conference on Privacy Enhancing Technologies, Jul. 11, 2012, pp. 180-200.

Coffman, et al., "Bin Packing Approximation Algorithms: Survey and Classification", In book: Handbook of Combinatorial Optimization, Retrieved on: Jul. 7, 2015, 14 pages.

Dinh, et al., "M2R: Enabling Stronger Privacy in MapReduce Computation", In Proceedings of in 24th USENIX Security Symposium, Retrieved on: Jul. 7, 2015, 16 pages.

Gentry, Craig, "Fully Homomorphic Encryption using Ideal Lattices", In Proceedings of Forty-First Annual ACM Symposium on Theory of Computing, May 31, 2009, pp. 169-178.

Goldreich, et al., "Software Protection and Simulation on Oblivious RAMs", In Journal of ACM, vol. 43, Issue 3, May 1996, pp. 431-4730.

Goldwasser, et al., "Probabilistic Encryption", In Journal of Computer and System Sciences, vol. 28, Issue 2, Apr. 1984, pp. 270-299.

Katz, et al., "Introduction to Modern Cryptography", In Publication of Chapman and Hall/CRC Press, Retrieved on: Jul. 7, 2015, 20 pages.

Ko, et al., "The HybrEx Model for Confidentiality and Privacy in Cloud Computing", In Proceedings of 3rd USENIX Conference on Hot Topics in Cloud Computing, Jun. 14, 2011, pp. 1-5.

McKeen, et al., "Innovative Instructions and Software Model for Isolated Execution", In Proceedings of 2nd International Workshop on Hardware and Architectural Support for Security and Privacy, Jun. 23, 2013, pp. 1-8.

Mitzenmacher, et al., "Probability and Computing: Randomized Algorithms and Probabilistic Analysis", In Publication of Cambridge University Press, Apr. 2005, 13 pages.

Ohrimenko, et al., "The Melbourne Shuffle: Improving Oblivious Storage in the Cloud", In Proceedings of 41st International Colloquium on Automata, Languages and Programming, Jul. 8, 2014, pp. 1-27.

Pandurangan, Vijay, "On Taxis and Rainbows: Lessons from NYC's Improperly Anonymized Taxi Logs", Published on: Jun. 21, 2014 Available at: https://medium.com/@vijayp/of-taxis-and-rainbows-f6bc289679a1.

Popa, et al., "CryptDB: Protecting Confidentiality with Encrypted Query Processing", In Proceedings of the Twenty-Third ACM Symposium on Operating Systems Principles, Oct. 23, 2011, pp. 85-100.

Roy, et al, "Airavat: Security and Privacy for MapReduce", In Proceedings of the 7th USENIX conference on Networked systems design and implementation, Apr. 28, 2010, pp. 1-16.

Schuster, et al., "VC3: Trustworthy Data Analytics in the Cloud using SGX", In Proceedings of IEEE Symposium on Security and Privacy, May 18, 2015, 17 pages.

Tetali, et al., "MrCrypt: Static Analysis for Secure Cloud Computations", In Proceedings of the ACM SIGPLAN international conference on Object oriented programming systems languages & applications, Oct. 29, 2013, pp. 271-286.

Tockar, Anthony, "Riding with the Stars: Passenger Privacy in the NYC Taxicab Dataset", Published on: Sep. 15, 2014 Available at: http://research.neustar.biz/2014/09/15/riding-with-the-stars-passenger-privacy-in-the-nyc-taxicab-dataset/.

Tu, et al., "Processing Analytical Queries over Encrypted Data", In Proceedings of the VLDB Endowment, vol. 6, Issue 5, Mar. 2013, pp. 289-300.

Wei, et al., "SecureMR: A Service Integrity Assurance Framework for MapReduce", In Proceedings of the Annual Computer Security Applications Conference, Dec. 7, 2009, pp. 73-82.

Xu, et al., "Controlled-Channel Attacks: Deterministic Side Channels for Untrusted Operating Systems", In Proceedings of the 36th IEEE Symposium on Security and Privacy, May 18, 2015, 640-656.

Goodrich et al. "Privacy-preserving access of outsourced data via oblivious RAM simulation" May 2, 2011.

Dinh, T.T.A. et al., "M2R: Enabling Stronger Privacy in Mapreduce Computation", SEC'15 Proceedings of the 24th USENIX Conference on Security Symposium, pp. 447-462, Aug. 12-14, 2015.

PCT Search Report and Written Opinion for corresponding International Application No. PCT/US2016/044142, dated Sep. 20, 2016, 13 pages.

Ohrimenko, O., et al., "The Melbourne Shuffle: Improving Oblivious Storage in the Cloud", Feb. 22, 2014, 27 pages.

Samanthula, B., et al., "Efficient Privacy-Preserving Range Queries Over Encrypted Data in Cloud Computing", 2013 IEEE Sixth International Conference on Cloud Computing, 2013, 8 pages.

"International Preliminary Report on Patentability Issued in PCT Application No. PCT/US2016/044142", dated Oct. 11, 2017, 6 Pages.

* cited by examiner

DATA CENTER PRIVACY

BACKGROUND

The use of public cloud infrastructure for storing and processing large structured datasets has gained widespread prominence. Where the datasets contain sensitive data such as names, addresses, ages, locations and other private data there are security concerns. Using advanced cryptography to provide privacy typically comes at a cost of performance reduction.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A data center is described which has a plurality of secure processing units; a plurality of data stores holding encrypted data records; and a network connecting the secure processing units and the data stores. The secure processing units comprise computing functionality configured to execute a data processing operation in parallel on the secure processing units by being configured to read one or more encrypted records from the stores, process one or more of the encrypted records within the secure processing units, send one or more of the encrypted records between the secure processing units over the network, and write one or more of the encrypted records to the stores. In various examples the data center is configured to carry out a secret shuffle of the encrypted data records to protect the privacy of the data processed in the data center from an observer that may observe any one or more of: the reading of the encrypted records, the sending of the encrypted records, the writing of the encrypted records; the secret shuffle comprising a random permutation of the encrypted records hidden from the observer.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
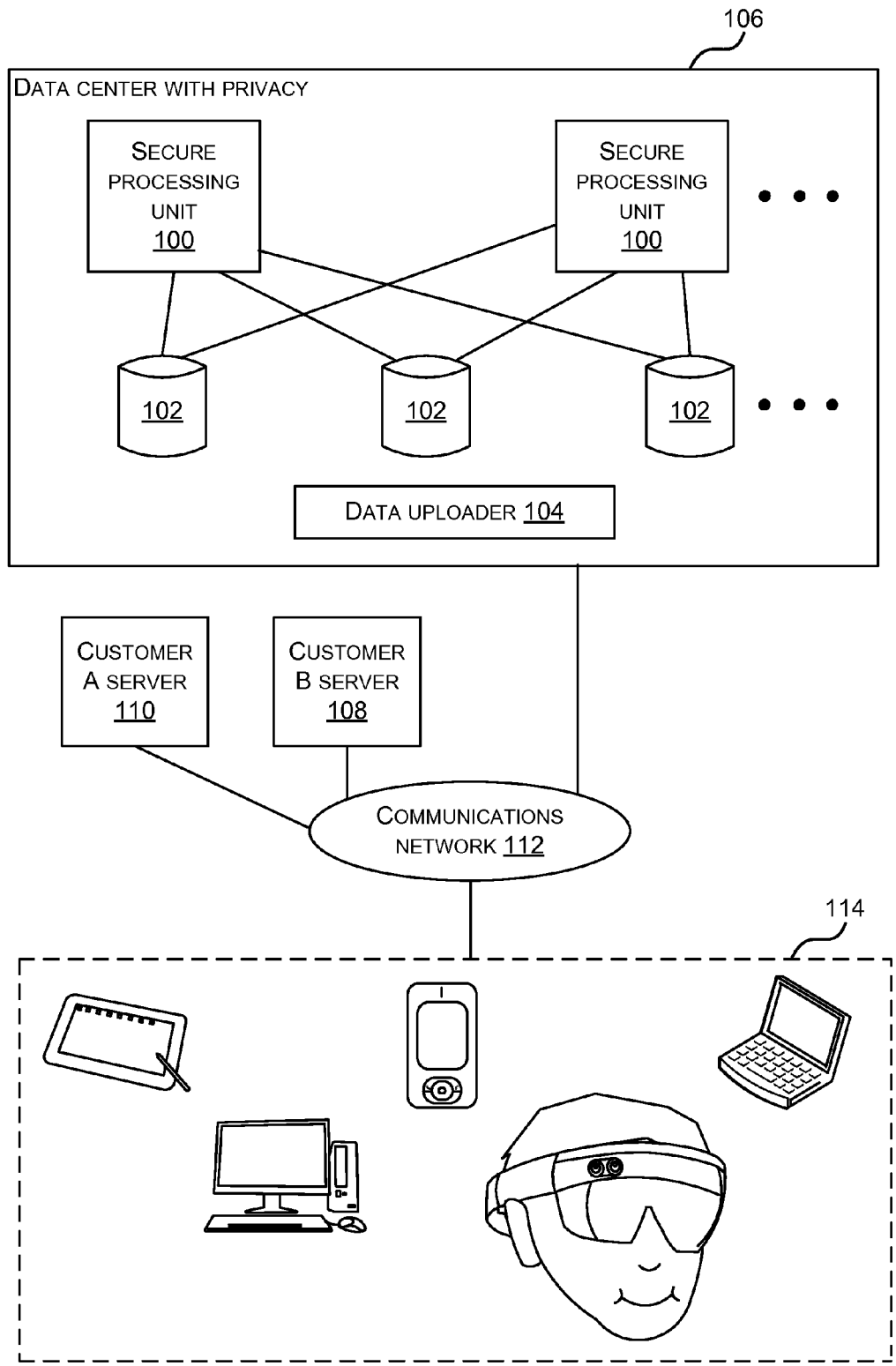
FIG. 1 is a schematic diagram of a data center with privacy functionality.

FIG. 1 is a schematic diagram of a data center 106 with privacy functionality. The data center comprises a plurality of secure processing units 100 connected using a network to a plurality of encrypted data stores 102. The data center may have a data uploader 104 to enable customers or other entities to upload data to data stores 102 of the data center. FIG. 1 shows two secure processing units 100 and three data stores 102 although in practice many more are present as indicated by the dots in FIG. 1. The data center provides cloud computing services to one or more customers who have servers 108, 110 or other computing entities which are able to access the data center via communications network 112. For example, customer A may have server 110 acting as a web server to provide electronic taxi booking services to end users via end user equipment 114. Data processing may be carried out in the data center as part of the electronic taxi booking services, for example, to match available taxis to requesting users. Results may be made available to end user equipment 114 via communications network 112. Taxi booking services are one example only and other services may be provided.

A secure processing unit is a trusted container of code and/or data that is isolated from the rest of the data center. For example, a secure processing unit may be implemented as a trusted physical machine, a trusted virtual machine or another form of trusted execution environment such as secure regions implemented as ranges of virtual memory addresses that are protected by secure processors using three mechanisms as now described.

A first mechanism comprises arranging the processors to control memory accesses to the secure regions. Code inside the region may be invoked through a call-gate mechanism that transfers control to an entry point inside the region. Code inside the region has full access to the data inside the region, but external read, write, and execute accesses to the memory region are blocked by the processor, even if they originate from code running at a high level of privilege. Thus, the software trusted computing base (TCB) is the code inside secure regions and, in particular, does not include the operating system or the hypervisor.

A second mechanism comprises arranging processors to encrypt and protect the integrity of cache lines when they are evicted to system memory (random access memory, RAM). Thus the data in the regions is not in the clear outside the physical processor package. This removes a broad class of hardware attacks, such as cold boot attacks, and limits the hardware TCB to the processor.

A third mechanism comprises arranging the processors to support remote attestation. When a region is created, the processor computes a cryptographic digest of the region and signs it with a secret key available to the processor. This allows an external entity to verify that data originated from a specific secure region. This mechanism is used to establish secure channels between regions and remote systems In the embodiments described herein the data processing in the data center is parallelized between replicated processing functions at different ones of the secure processing units 100, operating on different blocks or chunks of encrypted data records stored at the data stores 102. In this way the data processing is distributed over different computing entities in the data center and proceeds in a fast, efficient manner. In the embodiments herein the distributed processing comprises sending intermediate results between secure processing units. For example, in the case of relational databases, the distributed processing may be implementing computation of a join of data from two or more relational databases. In some examples the distributed processing is implemented using a map-reduce framework.

In the embodiments described herein, messages and data external to the secure processing units may be encrypted to facilitate privacy.

A map-reduce framework is one in which a plurality of processing units implement mapping functionality and a plurality of processing units implement reducing functionality in order to support parallel, distributed processing of large amounts of data which is divided into chunks. A chunk (also referred to as a batch in this document) is two or more records that are stored or processed together. The mapping functionality is an algorithm for taking chunks of data (divided from a large corpus of data), processing those according to a user specified process to generate intermediate data, where the intermediate data consists of data chunks, each with a corresponding key. A map-reduce framework then groups data chunks with the same key together and sends grouped chunks to a plurality of processing units which implement reducing functionality (this group-by operation is sometimes referred to as a shuffle). The reducing functionality is an algorithm for receiving the intermediate data chunks with the same key (as grouped by the group-by operation) and processing them according to a user specified process to generate output data. User specified processes for mapper and reducer functionalities, together, are referred to as a (map-reduce) job. For example, a job can be "compute number of males and females in a specified census dataset" and another job could be "compute number of females born in the US in a specified census dataset".

The embodiments described herein recognize that communications between the secure processing units 100 and data stores 102 in the data center may be observed and the observations used by malicious parties to find private data, such as the destination of a taxi in the taxi service example above. By carrying out an empirical analysis the inventors have found that observing patterns of encrypted communications between secure processing units and data stores in a data center, can yield precise information about datasets held at the data stores. For example, in the case of census data, details about the age of an individual, the place of work of an individual, the place of birth of an individual and other private data. For example, in the case of taxi service data, details about the taxi destinations of an individual. The embodiments described herein facilitate privacy of data center computations by making such observations of communications between different processing and network storage units of a data center useless for finding private data. This is achieved by using a secret shuffle process as described in more detail below. In various embodiments, trade-offs between privacy and data center performance are configurable.

A secret shuffle process is a process which implements a secret, random permutation of a plurality of data records. The shuffle is secret in that the permutation that it implements remains hidden from an observer of traffic flow between secure processing units and/or encrypted data stores within a data center. Note that a secret shuffle process is different from a group-by operation (sometimes referred to as shuffle in the context of map-reduce) which is used to group data chunks with the same key together in order to facilitate the functionality of a map-reduce framework. Thus there are at least two differences between secret shuffle processes of the present embodiments and the group-by operation of a map-reduce framework. A first difference is a difference in functionality whereby a secret shuffle permutes records according to a random permutation while a group-by operation groups key-value pairs by keys. A second difference relates to security. The secret shuffle processes of the present embodiments hide the permutation with respect to an observer observing traffic in the data center, whereas a group-by operation is not concerned with privacy.

In various examples a secret shuffle process is implemented as part of a data uploader 104, or as part of secure processing units 100. This is now described with reference to FIG. 2 which indicates schematically how various embodiments describe improving data privacy by removing 200 correlations between data input to a secure processing unit and data output by the secure processing unit by using a secret shuffle process.

In a first embodiment a secret shuffle 204 is implemented at various ones of the secure processing units, in order to secretly shuffle output data generated by those secure processing units. In a second embodiment a secret preliminary shuffle 202 is carried out before data processing. In some cases the second embodiment is extended by adding sampling and private communication balancing 206 to give improved efficiency and stronger privacy. Private communication balancing comprises balancing activity between secure processing units, such as activity to read, write or send encrypted records.

By using a secret shuffle process as described with reference to FIG. 2 it is possible to improve privacy of the data being processed in a data center without unduly detrimenting performance. For example, the secret shuffle process can be designed to fit into the parallel nature of a parallel data processing operation ongoing in the data center. For example, the secret shuffle process can be designed to cause only a relatively small increase in the number of communications sent between entities in the data center.

Figure 3:
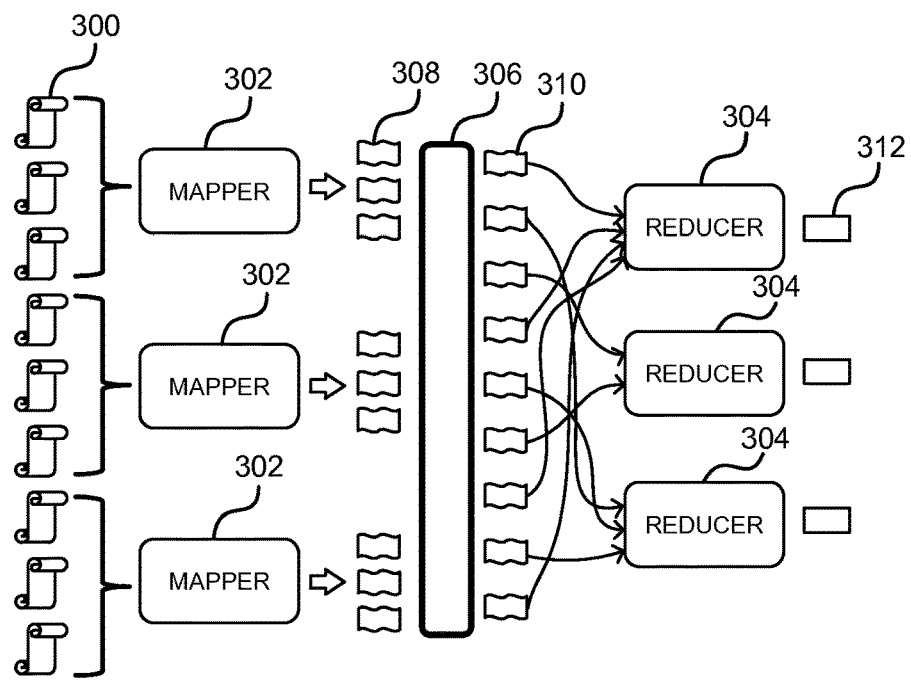
FIG. 3 is a schematic diagram of a shuffle in the middle deployment in a data center.

FIG. 3 is a schematic diagram of secret shuffle functionality 306 implemented as a shuffle-in-the-middle deployment. In this example the secure processing units 100 of the data center comprise mappers 302 and/or reducers 304 of a map-reduce framework. Each secure processing unit 100 may comprise a plurality of mappers and/or reducers, each mapper and each reducer comprising software and/or hardware. A mapper 302 takes as input a plurality of chunks of encrypted data 300, decrypts it and processes the input chunks to generate encrypted output data chunks 308. The output data chunks comprise patterns or correlations with respect to the input data chunks 300 which, if observed by a malicious observer, can compromise privacy. To address this a secret shuffle 306 is implemented on the output data chunks 308 to remove any patterns or correlations with respect to the input data chunks. This results in shuffled encrypted output data chunks 310 which are grouped by keys by the map-reduce framework and sent to the reducers 304 according to keys of the output data chunks 310. The reducers process the shuffled data chunks 310 to generate final output data 312. The secret shuffle functionality 306 is implemented with one or more of the secure processing units 100 so that it cannot be observed by a malicious observer.

In some examples the secret shuffle functionality is implemented by using a dedicated map function and a corresponding reduce function at various secure processing units 100 (referred to as an additional map function (of an additional mapper) and an additional reduce function (of an additional reducer)). However, this is not essential, the secret shuffle functionality may be implemented in other ways such as by using a trusted party or secret sorting. Using a trusted party involves sending data to a trusted party. Secret sorting comprising generating random keys and applying a secret sorting functionality.

Figure 4:
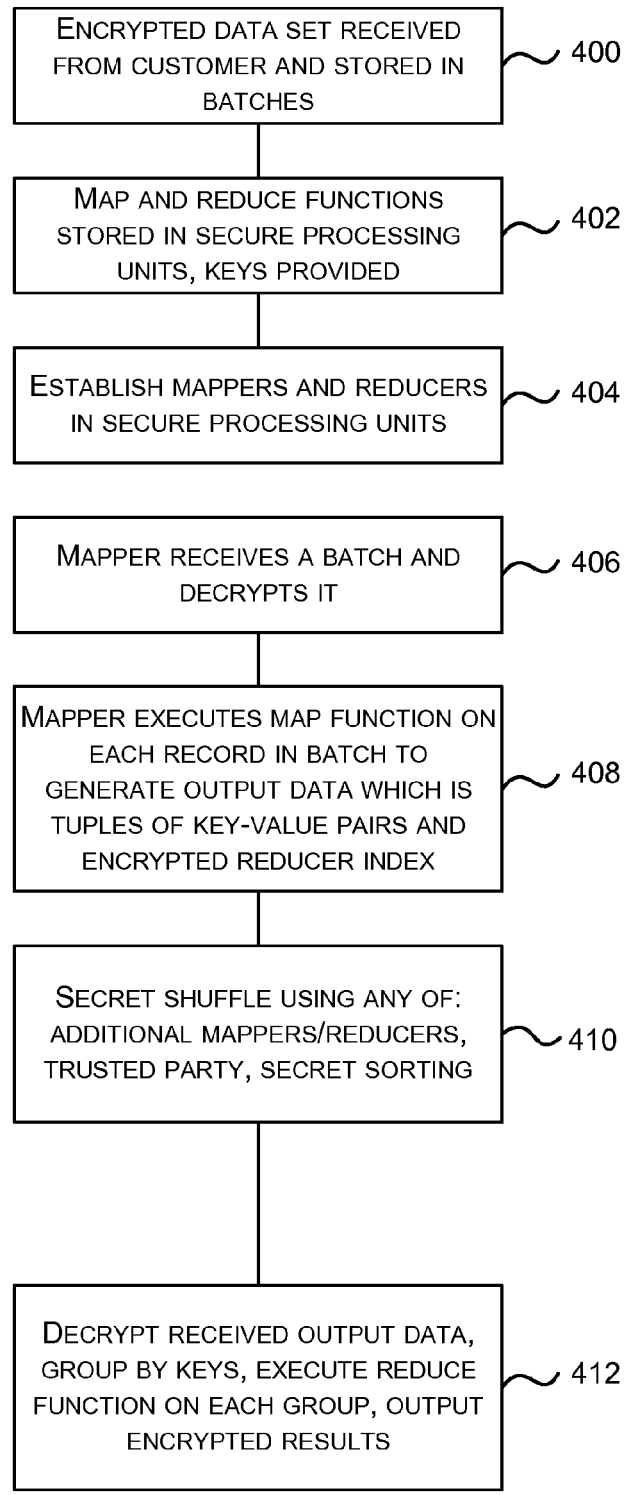
FIG. 4 is a diagram of a method used in a shuffle in the middle deployment.

FIG. 4 is a flow diagram of a method in an example shuffle-in-the-middle deployment. In this example an encrypted data set has been received 400 at the data center from a customer and has been stored in batches at various of the encrypted data stores 102. Computer software instructions or suitable computer hardware for implementing map and reduce functions of a particular job has been received 402 and is available at the data center. For example, a customer has uploaded map and reduce functions it specifies to a secure processing unit and has provided suitable cryptographic keys. Mappers and reducers are established 404 in the secure processing units 100 of the data center. The user can request more than one map-reduce job to be executed on the data that he has uploaded.

Once a mapper receives a batch of data, the mapper decrypts 406 the data and executes 408 a map function on each record in the batch to generate output data. The output data may comprise tuples of values, each tuple being an encrypted key-value pair and an encrypted reducer index.

A secret shuffle process is applied 410 using any implementation method such as additional mappers and additional reducers, or a secret sorting process, or a trusted party deployment.

A reducer receives 412 output data from mappers, decrypts the received data, groups it by keys, and executes its reduce function per group. The reducer then outputs encrypted results.

It can be seen from the method of FIG. 4 that the shuffle in the middle deployment does not significantly alter the ongoing parallel data processing operation of the data center (the main job). Thus the parallel nature of the main job is unaffected and performance is not unduly detrimented.

Figure 5:
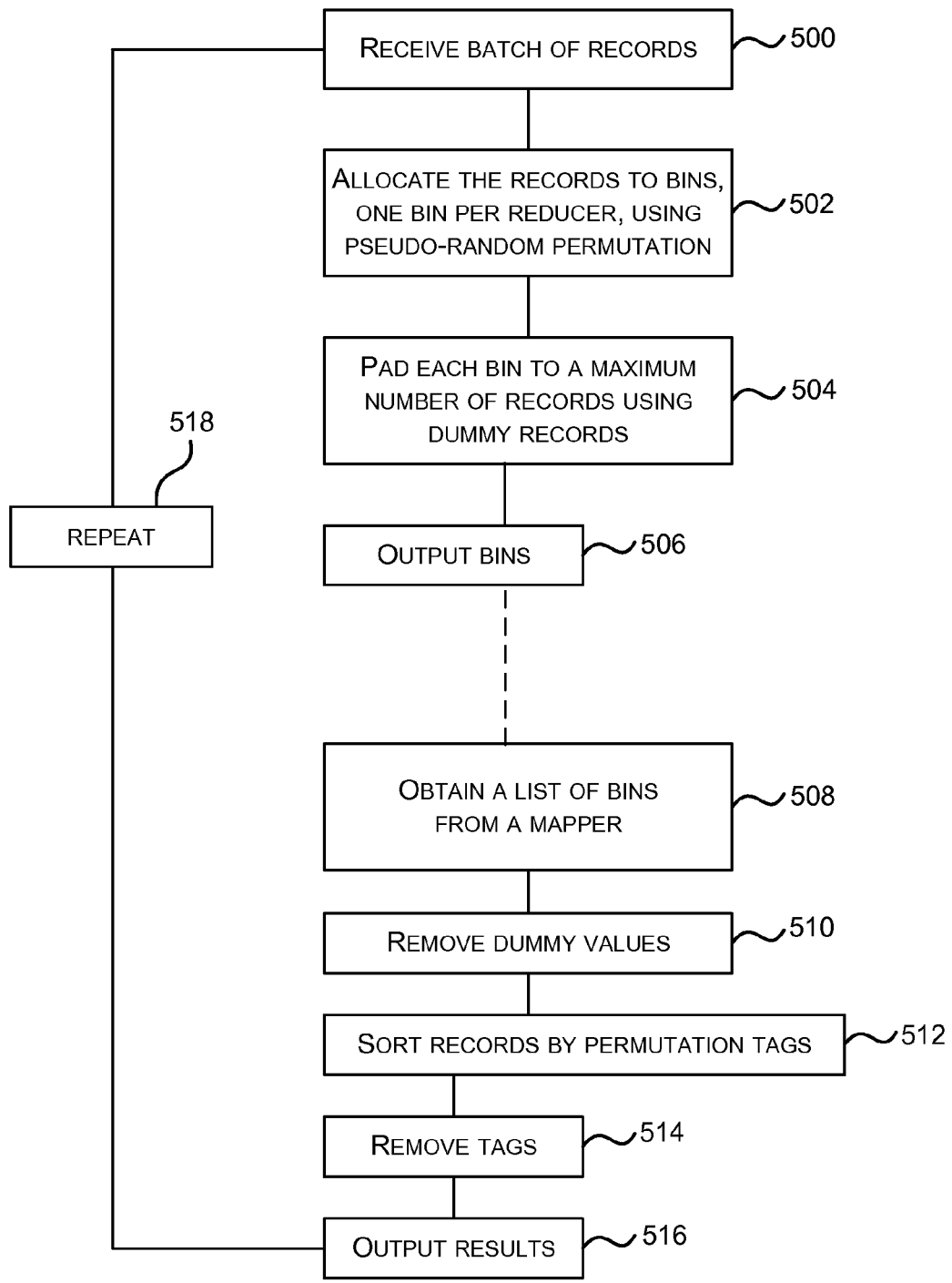
FIG. 5 is a diagram of part of the method of FIG. 4 in more detail.

An example in which the secret shuffle process of box 410 of FIG. 4 is implemented in map-reduce framework is now given in the flow diagram of FIG. 5. FIG. 5 shows the additional map function in boxes 500 to 506 and the additional reduce function in boxes 508 to 516 and illustrates how these are preferably repeated at least once to achieve good privacy (it is not essential to repeat at least one although the privacy will not be as good). The additional map function comprises receiving a batch of records 500 (these are batches of output data of step 408 of FIG. 4 comprising batches of tuples of values) and allocating the records to bins. There is one bin per reducer. The records are allocated to the bins and assigned permutation tags using a pseudo-random permutation. Each bin is then padded 504 to a maximum number of records using dummy records. A dummy record has the same size as a real record but is assigned to a special value reserved to represent a record to be discarded in a later step of data processing. The maximum number of bins is specified as described in more detail below. The padded encrypted bins and corresponding bin number are then output to reducers. Since each bin is encrypted an observer cannot determine how many real records are in each bin.

The map-reduce framework groups bins with the same bin number together.

An additional reducer receives padded bins with the same bin number. It obtains a list 508 of bins from additional mappers, decrypts them, removes 510 the dummy values that is records that have the special value, and sorts the records by permutation tags which were assigned during the bin allocation process. The additional reducer removes the tags 514, encrypts the records and outputs them as results 516.

The process then repeats 518 at least once to further enhance privacy. It is not essential to repeat the process as a working solution is achieved without repeating.

The method of FIG. 5 illustrates how relatively few additional communications are sent to implement the secret shuffle and how these communications proceed independently of the main job. Thus the shuffle in the middle deployment has relatively little effect on performance of the data center.

Figure 2:
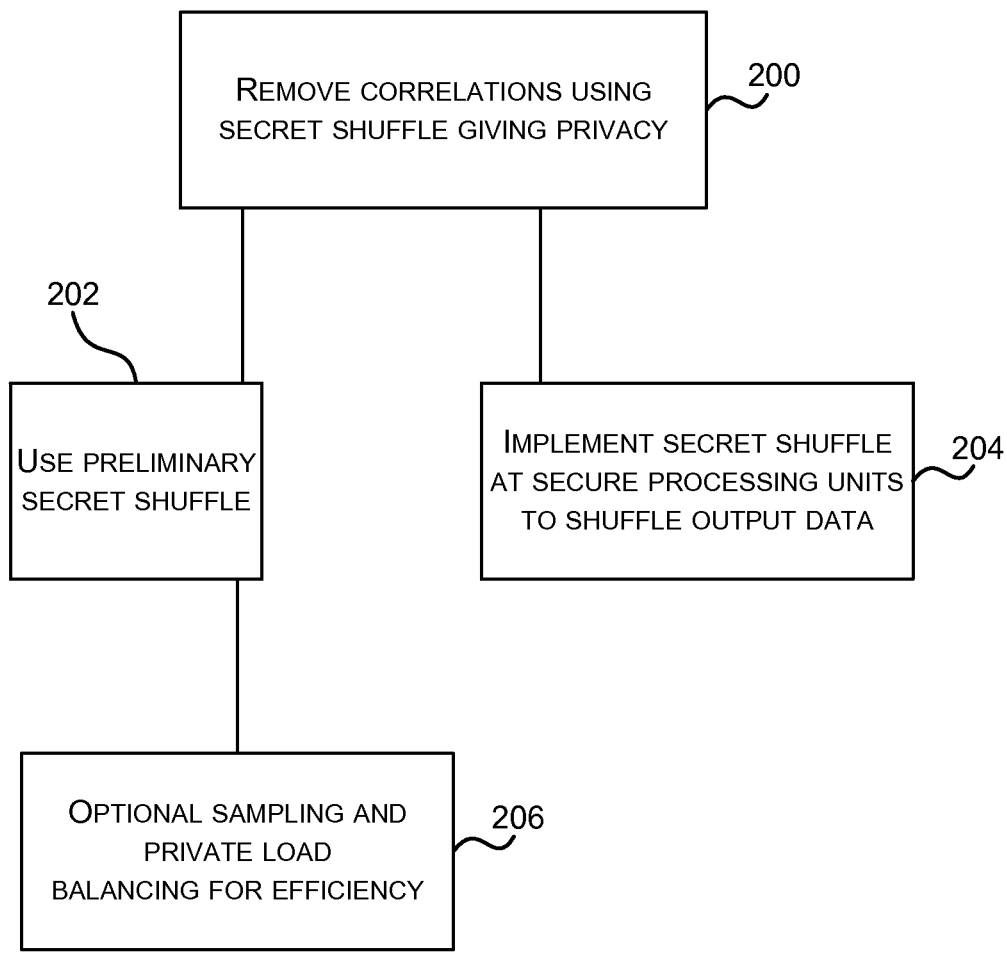
FIG. 2 is a diagram of methods of providing privacy functionality in a data center.

In another example, a preliminary secret shuffle is implemented as illustrated in FIG. 2 box 202. In this case the secret shuffle can be carried out as part of a data upload process whereby data is uploaded to the data center. In another case (see FIG. 6) the preliminary secret shuffle is carried out in an offline phase, to data which has already been uploaded to the data center. In these cases the preliminary secret shuffle does not detriment performance of the data center at all.

Figure 6:
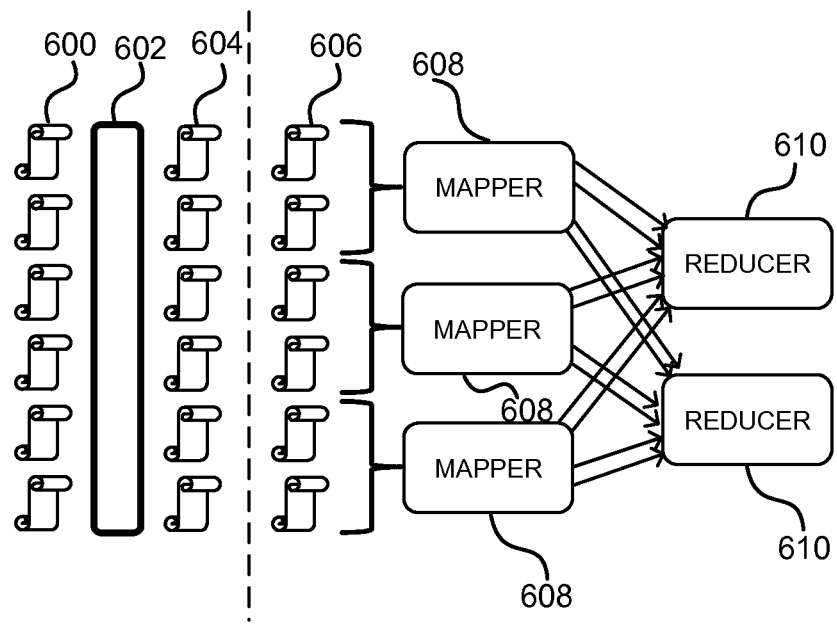
FIG. 6 is a schematic diagram of a preliminary shuffle deployment in a data center.

FIG. 6 shows mappers 608 and reducers 610 at secure processing units of a data center and with the mappers accessing chunks of secretly shuffled data 606. The secretly shuffled data 606 is produced in an offline phase (indicated to the left of the dotted line in FIG. 6) by secret shuffle functionality 602 implemented using software and/or hardware. The input to the secret shuffle functionality 602 is chunks of data 600 in which correlations between the ordering of input data records and values of their attributes exist. The secret shuffle functionality erases these correlations by randomizing the ordering of the input records to produce shuffled chunks 604. The secret shuffle functionality may be implemented using map and reduce functions at the secure processing units as described above with reference to FIG. 5. This is carried out once during the offline phase and does not need to be repeated for different map-reduce jobs on the shuffled data 606.

The mappers 608 and reducers 610 proceed to process the shuffled data 606 in parallel during an online phase (to the right of the dotted line) and malicious observers of data center traffic are less likely to be able to extract private data because correlations between the ordering of input data records and values of their attributes have been removed in a way which is not observable.

Figure 7:
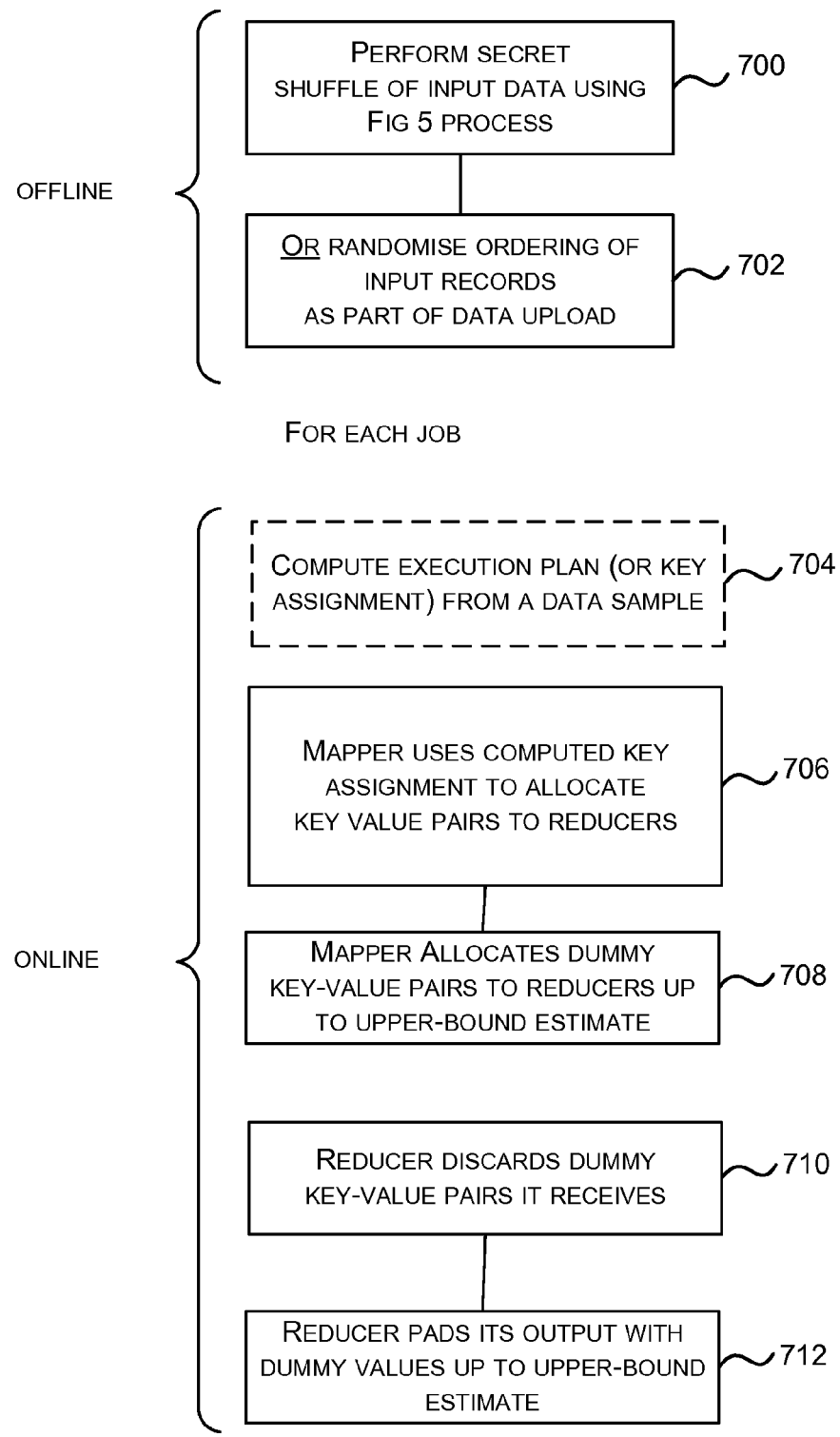
FIG. 7 is a flow diagram of a method in a preliminary shuffle deployment.

FIG. 7 is a flow diagram showing how the offline phase of FIG. 6 can be carried out 700 using the process of FIG. 5 or as part of a data upload process 702. FIG. 7 also shows an example method in an online phase.

In various examples, the online phase of FIG. 6 is modified in a job-specific manner as illustrated in FIG. 7.

This is an example of box 206 of FIG. 2 in which sampling and private communication balancing is carried out to give a privacy preserving process with stronger privacy guarantees. The balancing (between secure processing units) of volume of communications and accesses on the network is referred to as privacy-preserving if it hides the volume of communications and accesses that would be revealed to an observer of the network of an unprotected data processing operation. This is referred to as a shuffle and balance solution. The shuffle and balance solution preserves the parallelism of the data processing operation of the data center. The shuffle and balance solution improves privacy by hiding the distribution of communications between entities of the data center.

For a map-reduce job, privacy preserving balancing hides key-weight distributions where weight is determined by the number of key-value pairs assigned to a given key. For example, if there are four keys in a map-reduce job where there are 40% of key-value pairs with key1, 40% with key2, 10% with key3 and 10% with key4, the privacy-preserving balancing may hide the distribution of key2, key3 and key4. That is, an observer may think that key2, key3 and key4 appear 20% each in the job. Furthermore, an operator can even decide to hide that key1 appears 40% of the time and choose to reveal that it is something greater, e.g., 45% or 50% (later referred as a threshold).

In shuffle and balance embodiments, for each job in which a specified input data set is to be processed at the data center using specified map and reduce functions, the data center uses an execution plan to determine the volume of communication to be sent between processing units. The execution plan can be computed 704 during the offline phase, if the jobs to be executed are known in advance, or before executing the map-reduce job. The execution plan specifies how much padding is to be made to the encrypted communications. For example, by specifying how many dummy records are to be added to the real records before encrypting and sending them between processing units or writing them in a data store.

Figure 8:
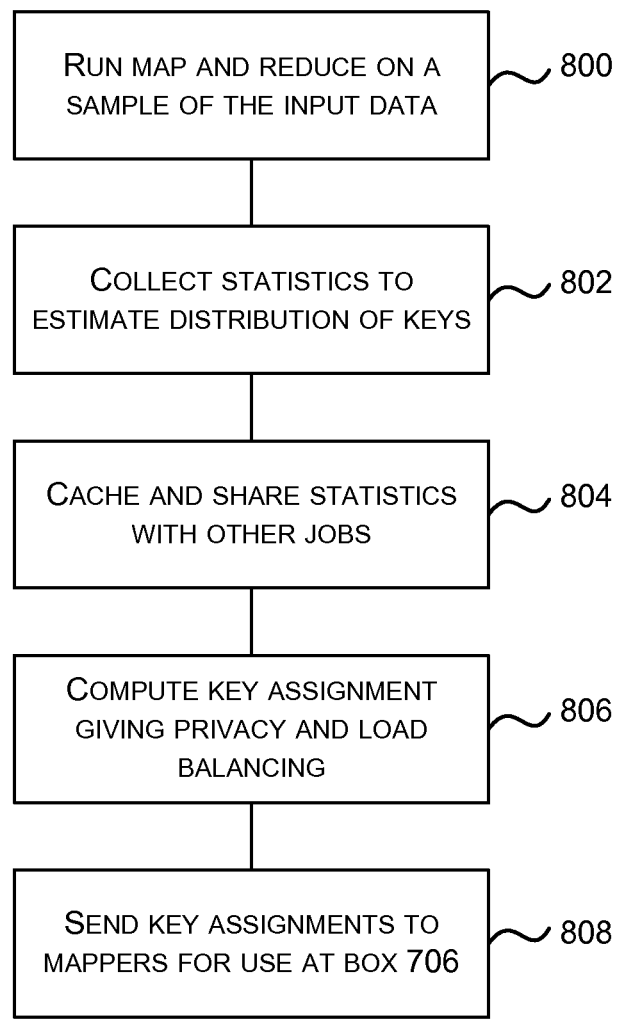
FIG. 8 is a flow diagram of more of the method of FIG. 7.

In FIG. 8 there is an example of computation of the execution plan before execution of a user-specified map-reduce job. For each job the specified map and reduce functions are run 800 on a sample of the input data. During the process of step 800 statistics are collected 802 to estimate the distribution of keys of the key-value pairs output by individual ones of the mappers. The statistics are optionally cached 804 so they can be shared with other jobs using the same map and reduce functions. This step can be performed on a single secure processing unit without communication with other secure processing units since the sample of the data to get good statistics can be small and fit on one secure processing unit. This step does not detriment the performance since processed data is small and this step is secure since it is executed on a single secure processing unit.

The statistics are used to compute 806 a key assignment (also referred to as an execution plan) which gives privacy by balancing the volume of observable communications between secure processing units and volume of accesses from secure units to data stores. For example, balancing in map-reduce communication means that every mapper reads roughly the same volume of input data and sends roughly the same volume to every reducer, and every reducer outputs roughly same volume. A key assignment is a mapping between keys and reducers indicating which mapper output data is to be sent to which reducers. The execution plan also includes the upper bound of key-value pairs to be sent to every reducer. The key assignment is then sent 808 to the mappers to use at box 706 of FIG. 7 as described below.

With reference to FIG. 7 once a mapper receives the key assignment, it uses them to allocate 706 key value pairs to reducers. The mapper also allocates 708 dummy key-value pairs to reducers up to an upper-bound estimate. The way in which the upper-bound estimate is obtained is described later. A dummy key-value pair has the same size as a real key-value pair with specially reserved content that is easily distinguishable from real key-value pairs when not encrypted. The mapper then encrypts all key-value pairs assigned to the same reducer and attaches a reducer number to encrypted pairs. The mapper outputs encrypted pairs and corresponding reducer numbers. By sending dummy key-value pairs to reducers in this way the volume of real key-values pairs is hidden from an observer. The offline shuffle ensures that a mapper receives a distribution of key-value pairs that does not significantly differ from other mappers. Since the dummy key value pairs are used to hide differences in key-value distribution across mappers, only a small number of dummy key-value pairs is required, not detrimenting performance significantly. Since dummy key-value pairs are also used to hide the volume of key-value pairs that have the same key, that is, how many key-value pairs each reducer receives, the number of dummy key-value pairs to be added determines how much one wants to hide about the distribution. Hence, giving a tradeoff between privacy and performance.

Reducers receive key value pairs from mappers and discard 710 dummy key-value pairs, that is pairs that have specially reserved content. A reducer pads 712 its output with dummy values up to an upper bound estimate in order to hide the volume of real output from an observer. The upper bound estimate is obtained as described below.

Figure 9:
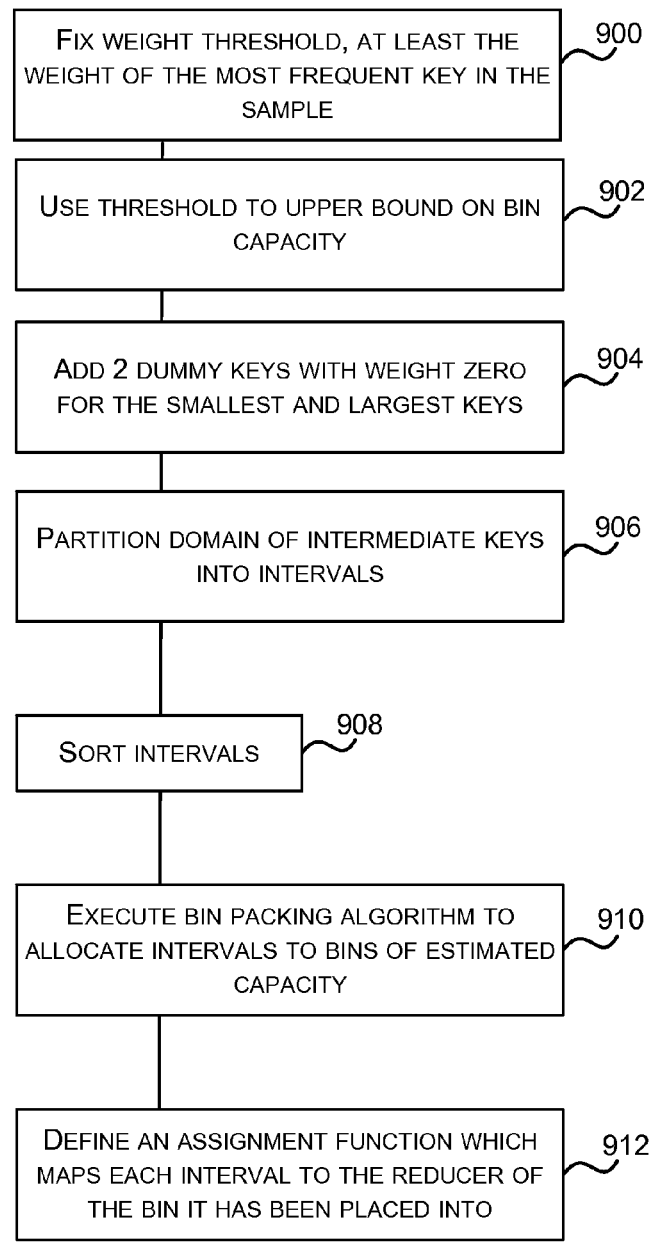
FIG. 9 is a flow diagram of a method of computing a key assignment.

An example of how a key assignment which facilitates privacy-preserving communication balancing may be computed is now given with respect to FIG. 9. A threshold on the weight of the most frequent key is chosen 900, the weight of a key is the number of key-value pairs assigned to the same key out of all key-value pairs. This threshold may be pre configured by an operator, may be dynamically configured by a user, or may be automatically calculated using well known parameter estimation techniques from the sample. For example, it can be the weight of the most frequent key in the sample. This threshold determines how many additional dummies are to be added by each mapper. For example, more dummies are used if the threshold is fixed at 50% than 21% when the real highest frequency is 20%. This threshold is then used to estimate an upper bound 902 on the number of key-value pairs a mapper has to allocate to a bin (referred as bin capacity) that is then mapped to a reducer. A similar process is done to estimate a threshold on the volume of reducer output.

Given the capacity estimate on each bin, a secret assignment of keys to bins is generated. A domain of possible keys is known from the sampling process and two dummy keys are added 904 to this domain. The dummy keys have weight zero and are added as the smallest and largest keys of the sampled domain to ensure the domain is large enough. The other keys each have a weight determined as specified above.

The domain of keys is partitioned 906 into intervals (so that the total weight of keys in each interval is less than the estimated threshold) and the intervals are sorted 908 according to total weight of keys in the intervals. A bin packing algorithm is then executed 910 to allocate the intervals to bins where a bin maps to a reducer and bin capacity is as determined above. Any well-known bin packing algorithm may be used. An assignment function is then computed 912 which maps each interval to the reducer of the bin it has been placed into.

In the method of FIG. 7 upper bound estimates are used for knowing how much padding to make to the key-value pairs sent from a mapper to reducers, and how much padding to make to reducer output. The padding is determined by considering the maximum number of bins that would be required by the chosen bin packing algorithm in step 910 of FIG. 9 for any key-weight distribution. Every reducer then receives a number of key-value pairs padded to account for the maximum number of bins of fixed capacity. An observer of communication between mapper and reducer can observe encrypted data of volume that depends on bin capacity and number of bins. Since bin capacity and the number of bins is maximized over all possible key-weight distributions and depends only on a threshold, the real key-value assignment and key distribution is hidden and only the threshold is revealed to an observer.

Alternatively, or in addition, the functionality of the secret shuffle, the secure processing units, and/or data uploader described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 10:
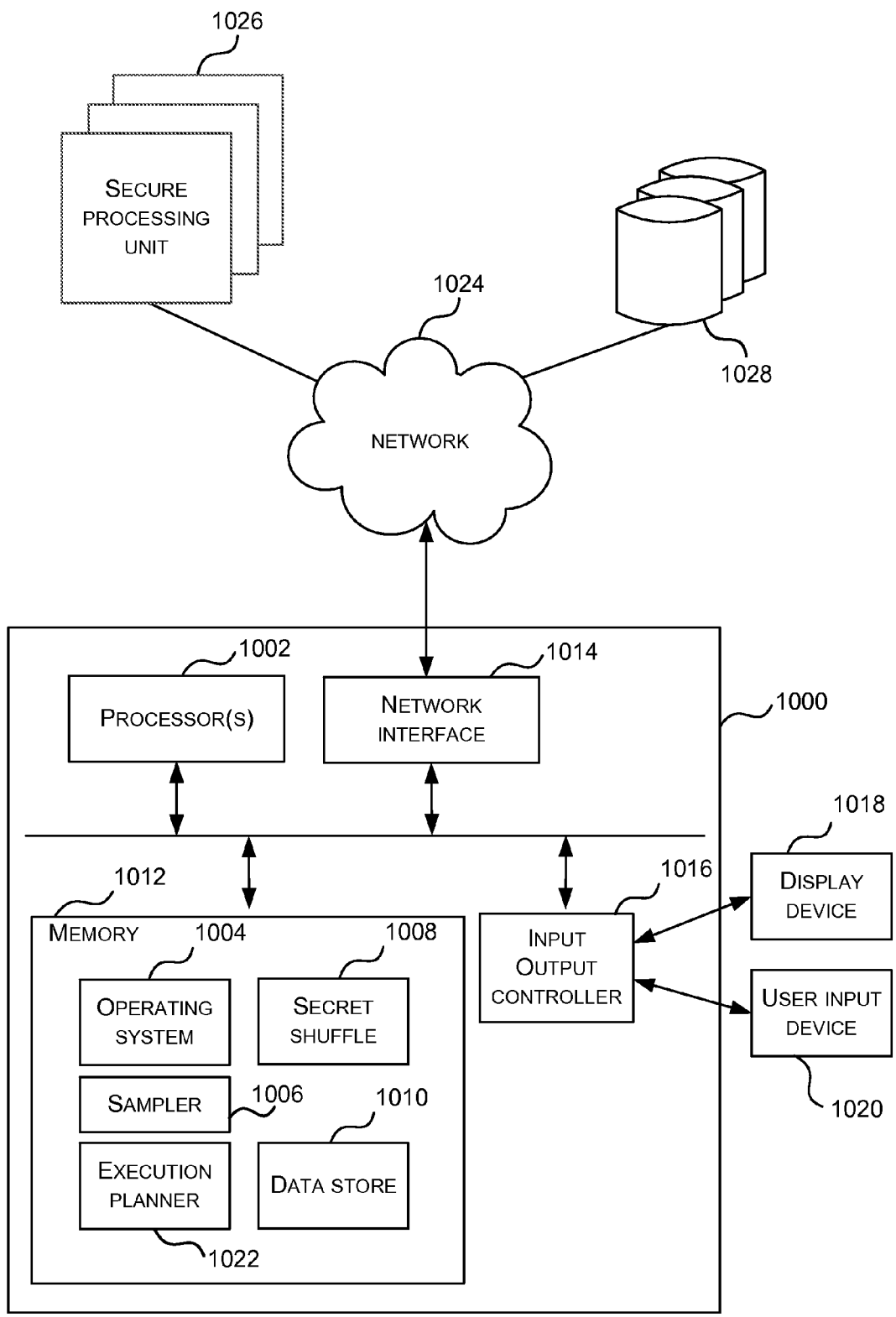
FIG. 10 illustrates an exemplary computing-based device in which embodiments of a data center compute node may be implemented.

FIG. 10 illustrates various components of an exemplary computing-based device 1000 which may be implemented as any form of a computing and/or electronic device, and in which embodiments of a computational node of a data center may be implemented, such as a server comprising one or more of the secure processing units 100 of FIG. 1, or a data uploader.

The computational node of the data center is connected by a network 1024 to a plurality of secure processing units 1026 and a plurality of data stores 1028 as described above with reference to FIG. 1. The computing-based device may be, or may contain one or more secure processing units.

Computing-based device 1000 comprises one or more processors 1002 which may be microprocessors, controllers or any other suitable type of processors for processing computer executable instructions to control the operation of the device in order to facilitate privacy in a data center by removing correlations or patterns in data stored at the data center or sent between entities of the data center. In some examples, for example where a system on a chip architecture is used, the processors 1002 may include one or more fixed function blocks (also referred to as accelerators) which implement a part of the method of any of FIGS. 4, 5, 7, 8 and 9 in hardware (rather than software or firmware). Platform software comprising an operating system 1004 or any other suitable platform software may be provided at the computing-based device to enable application software to be executed on the device. Secret shuffle component comprises instructions to implement a secret shuffle as part of a shuffle in the middle, shuffle and balance, or preliminary shuffle as described herein. A sampler 1006 comprises instructions to compute statistics such as distributions of keys output by individual mappers or other computing entities, an execution planner comprises instructions to compute an efficient, private execution plan for sending data to reducers or other computing entities such that communications are balanced between the reducers or other computing entities. A data store 1010 holds statistics, estimated bounds, cached data, user configured parameters and other data.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1012 it will be appreciated that the storage may be distributed or located remotely and accessed via a network or other communication link (e.g. using network interface 1014).

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface (NUI). This user input may be used to set parameter values, specify upper bounds, define mapper functions, define reduce functions, specify data sources for upload and for other purposes. In an embodiment the display device 1018 may also act as the user input device 1000 if it is a touch sensitive display device. The input/output controller 1016 may also output data to devices other than the display device, e.g. a locally connected printing device.

Any of the input/output controller 1016, display device 1018 and the user input device 1020 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example there is a data center comprising:

a plurality of secure processing units;

a plurality of data stores holding encrypted data records; and a network connecting the secure processing units and the data stores;

wherein the secure processing units are configured to execute a data processing operation in parallel by being configured to read encrypted records from the stores, process one or more of the encrypted records within the secure processing units, send one or more of the encrypted records between the secure processing units over the network, and write the encrypted records to the stores;

and wherein the data processing operation is configured to carry out a secret shuffle of at least some of the encrypted records to protect the privacy of the data being processed from an observer that may observe any one or more of: the reading of the encrypted records, the sending of the encrypted records, the writing of the encrypted records;

the secret shuffle comprising a random permutation of the encrypted records hidden from the observer.

In an example the data center comprises a data uploader configured to upload the encrypted data records to the data stores by carrying out the secret shuffle of the encrypted data records as part of the upload.

In an example the secure processing units are configured to carry out the secret shuffle of the encrypted data records before executing the data processing operation.

For example, the secure processing units are configured to carry out a secret shuffle of the encrypted data records sent between the secure processing units.

For example, the data processing operation is implemented using a plurality of mappers and a plurality of reducers at the secure processing units.

The data center may comprise a plurality of additional mappers and additional reducers at the secure processing units, the additional mappers and additional reducers arranged to carry out the secret shuffle.

In examples the mappers are arranged to pad their outputs.

In examples the reducers are arranged to pad their outputs.

In an example the additional mappers and additional reducers are configured to execute at least twice per secret shuffle.

In an example the secure processing units comprise an execution plan for the data processing operation, the execution plan arranged to balance the amount of activity between individual ones of the secure processing units, where activity comprises any of: the reading of the encrypted records, the sending of the encrypted records, the writing of the encrypted records.

In an example the secure processing units are configured to compute an execution plan for the data processing operation to balance the amount of activity between individual ones of the secure processing units, where activity comprises any of: the reading of the encrypted records, the sending of the encrypted records, the writing of the encrypted records, the execution plan comprising an amount of padding to be applied to the encrypted data records.

In an example the data processing operation is implemented using a plurality of mappers and a plurality of reducers and where the mappers are configured to compute an execution plan for the data processing operation to balance the amount of activity between individual ones of the secure processing units, where activity comprises any of: the reading of the encrypted records, the sending of the encrypted records, the writing of the encrypted records.

In an example the execution plan has been computed using a sample from a data processing operation.

In an example the execution plan has been calculated from cached data about observed distributions of records produced by mappers.

In an example the execution plan is specific to a particular data processing operation.

In an example the execution plan comprises a record key assignment indicating which records are to be sent to which reducers.

In an example the execution plan comprises a key assignment, assigning keys to reducers, which hides key distribution among key-record pairs of the data processing operation.

In an example there is a method of facilitating privacy at a data center comprising:

executing a data processing operation in parallel using a plurality of secure processing units, the data processing operation comprising reading encrypted records from a plurality of data stores connected to the secure processing units via a network, processing one or more of the encrypted records within the secure processing units, sending one or more of the encrypted records between the secure processing units over the network, and writing encrypted records to the stores; and carrying out a secret shuffle of the encrypted data records to facilitate the privacy of the data being processed from an observer that may observe any one or more of: the reading of the encrypted records, the sending of the encrypted records, the writing of the encrypted records; the secret shuffle comprising a random permutation of the encrypted records which is hidden from the observer.

For example the secure processing units comprise mappers and reducers and comprising padding the output of one or more of the mappers.

In an example there are one or more tangible device-readable media with device-executable instructions that, when executed by a computing system, direct the computing system to perform steps comprising:

executing a data processing operation in parallel using a map-reduce framework implemented using a plurality of secure processing units, the data processing operation comprising reading encrypted records from a plurality of data stores connected to the secure processing units via a network, processing one or more of the encrypted records within the secure processing units, sending one or more of the encrypted records between the secure processing units over the network, and writing encrypted records to the stores; and carrying out a secret shuffle of the encrypted data records to facilitate the privacy of the data being processed from an observer that may observe any one or more of: the reading of the encrypted records, the sending of the encrypted records, the writing of the encrypted records; the secret shuffle comprising a random permutation of the encrypted records which is hidden from the observer.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A data center comprising:
   a plurality of secure processing units;
   a plurality of data stores holding encrypted data records; and
   a network connecting the secure processing units and the data stores,
   wherein the secure processing units are configured to execute a data processing operation in parallel by being configured to read encrypted records from the plurality of data stores, process one or more of the encrypted data records within the secure processing units, send one or more of the encrypted data records between the secure processing units over the network, and write the encrypted data records to the plurality of data stores,
   wherein the data processing operation is implemented using a plurality of mappers and a plurality of reducers, the plurality of mappers are configured to compute an execution plan, include a record key assignment, for the data processing operation to balance the amount of activity between individual ones of the plurality of secure processing units,
   wherein the data processing operation is configured to carry out a secret shuffle of at least some of the encrypted data records to protect privacy of data being processed from an observer that may observe any one or more of: the reading of the encrypted data records, the sending of the encrypted data records, and the writing of the encrypted data records,
   wherein the secret shuffle comprises a random permutation of the encrypted data records hidden from the observer, and
   wherein the plurality of secure processing units include a plurality of additional mappers and a plurality of additional reducers, the plurality of additional mappers and the plurality of additional reducers are arranged to carry out the secret shuffle.

2. The data center of claim 1, further comprising:
   a data uploader configured to upload the encrypted data records to the plurality of data stores by carrying out the secret shuffle of the encrypted data records as part of the upload.

3. The data center of claim 1, wherein the plurality of secure processing units are configured to carry out the secret shuffle of the encrypted data records before executing the data processing operation.

4. The data center of claim 1, wherein the plurality of secure processing units are configured to carry out the secret shuffle of the encrypted data records sent between secure processing units of the plurality of secure processing units.

5. The data center of claim 1, wherein the data processing operation is implemented using the plurality of mappers and the plurality of reducers at the plurality of secure processing units.

6. The data center of claim 5, wherein the plurality of mappers are arranged to pad their outputs.

7. The data center of claim 5, wherein the plurality of reducers are arranged to pad their outputs.

8. The data center of claim 1, wherein the plurality of additional mappers and the plurality of additional reducers are configured to execute at least twice per secret shuffle.

9. The data center of claim 1, wherein the plurality of secure processing units comprise an execution plan for the data processing operation, the execution plan arranged to balance the amount of activity between individual ones of the plurality of secure processing units, where activity comprises any of: the reading of the encrypted data records, the sending of the encrypted data records, and the writing of the encrypted data records.

10. The data center of claim 9, wherein the execution plan having been computed using a sample from a data processing operation.

11. The data center of claim 9, wherein the execution plan being specific to a particular data processing operation.

12. The data center of claim 1, wherein the plurality of secure processing units are configured to compute an execution plan for the data processing operation to balance the amount of activity between individual ones of the plurality of secure processing units, where activity comprises any of: the reading of the encrypted data records, the sending of the encrypted data records, and the writing of the encrypted data records, and
wherein the execution plan comprises an amount of padding to be applied to the encrypted data records.

13. The data center of claim 1, wherein the activity comprises any of: the reading of the encrypted data records, the sending of the encrypted data records, and the writing of the encrypted data records.

14. The data center of claim 13, wherein the execution plan having been calculated from cached data about observed distributions of the encrypted data records produced by the plurality of mappers.

15. The data center of claim 13, wherein the record key assignment indicates which encrypted data records are to be sent to which reducer of the plurality of reducers.

16. The data center of claim 13, wherein the execution plan comprises a key assignment, assigning keys to reducers of the plurality of reducers, which hides key distribution among key-record pairs of the data processing operation.

17. A method of facilitating privacy at a data center comprising:
executing a data processing operation in parallel using a plurality of secure processing units, the data processing operation comprising reading encrypted data records from a plurality of data stores connected to the plurality of secure processing units via a network, processing one or more of the encrypted data records within the plurality of secure processing units, sending one or more of the encrypted data records between the plurality of secure processing units over the network, and writing encrypted data records to the plurality of data stores, wherein the data processing operation is implemented using a plurality of mappers and a plurality of reducers, the plurality of mappers are configured to compute an execution plan, include a record key assignment, for the data processing operation to balance the amount of activity between individual ones of the plurality of secure processing units; and
carrying out a secret shuffle of the encrypted data records to facilitate privacy of data being processed from an observer that may observe any one or more of: the reading of the encrypted data records, the sending of the encrypted data records, and the writing of the encrypted data records,
wherein the secret shuffle comprises a random permutation of the encrypted data records which is hidden from the observer, and
wherein the plurality of secure processing units include a plurality of additional mappers and a plurality of additional reducers, the plurality of additional mappers and the plurality of additional reducers are arranged to carry out the secret shuffle.

18. The method of claim 17, wherein at least one of the plurality of mappers are arranged to pad their outputs and the plurality of reducers are arranged to pad their outputs.

19. One or more non-transitory device-readable media with device-executable instructions that, when executed by a computing system, direct the computing system to perform steps comprising:
executing a data processing operation in parallel using a plurality of secure processing units, the data processing operation comprising reading encrypted data records from a plurality of data stores connected to the plurality of secure processing units via a network, processing one or more of the encrypted data records within the plurality of secure processing units, sending one or more of the encrypted data records between the plurality of secure processing units over the network, and writing encrypted data records to the plurality of data stores, wherein the data processing operation is implemented using a plurality of mappers and a plurality of reducers, the plurality of mappers are configured to compute an execution plan, include a record key assignment, for the data processing operation to balance the amount of activity between individual ones of the plurality of secure processing units; and
carrying out a secret shuffle of the encrypted data records to facilitate privacy of data being processed from an observer that may observe any one or more of: the reading of the encrypted data records, the sending of the encrypted data records, and the writing of the encrypted data records,
wherein the secret shuffle comprises a random permutation of the encrypted data records which is hidden from the observer, and
wherein the plurality of secure processing units include a plurality of additional mappers and a plurality of additional reducers, the plurality of additional mappers and the plurality of additional reducers are arranged to carry out the secret shuffle.

20. The one or more non-transitory device-readable media of claim 19, wherein at least one of the plurality of mappers are arranged to pad their outputs and the plurality of reducers are arranged to pad their outputs.

* * * * *